Oct. 29, 1963  E. S. CHATLOS  3,108,566

LIQUID-MOISTURE INDICATOR

Filed May 3, 1962

INVENTOR.
Edward S. Chatlos,
BY
Dudley B. Howard,
Attorney

United States Patent Office 3,108,566
Patented Oct. 29, 1963

3,108,566
LIQUID-MOISTURE INDICATOR
Edward S. Chatlos, Morris Plains, N.J., assignor to The McIntire Company, Livingston, N.J., a corporation of New Jersey
Filed May 3, 1962, Ser. No. 192,247
7 Claims. (Cl. 116—117)

This invention relates in general to fluid conducting systems, such as the refrigerant-carrying line of a refrigeration or air-conditioning system, and has particular reference to devices connected in any such system to indicate flow of the primary fluid, the condition of the primary fluid, or the presence therein of undesired substances in suspension, such as moisture.

To be more explicit, a typical indicator device includes a body adapted to be fitted in the fluid conducting line and having a through passage for fluid flow. The body is provided in a lateral wall with an inspection window through which the fluid in the line may be viewed from outside. For detection of the presence of moisture in the primary fluid, a tiny disk-like element of moisture indicating material is retained demountably in contact with the inner face of the inspection window in a position exposed to the said fluid. The indicator element is impregnated with a chemical which will change in visual appearance, such as in color, when subjected to moisture.

Prior to my present invention, the means employed by others to retain the indicator disk in contact with the inspection window has possessed certain disadvantages. For instance, in the disk-retaining means of the prior art most closely resembling my own, a moisture indicator subassembly is pressed against the inspection window of the body of the device by a solid retainer pin which extends laterally across the fluid flow passage to a screw plug by which the degree of retaining pressure may be regulated. In this device, the retainer pin masks an extensive central area of the indicator disk which otherwise would be desirably exposed to the fluid flowing through the interior passage of the device.

In view of the above-mentioned disadvantage of the most pertinent prior art liquid-moisture indicator, it is the primary object of my invention to provide improved retaining means for the indicator disk which will be highly efficient in the accomplishment of its purpose and at the same time will mask only a narrow marginal area of said disk.

Another object of the invention is to provide retaining means for the indicator disk which will maintain constantly firm pressure on the inspection window regardless of changes in thermal contraction and expansion of the said retaining means.

A further object is to provide retaining means for the indicator disk which is of such construction that there will be minimum flow restriction due to smaller mass of material in the path of the fluid stream.

It is an object also to employ novel means to position the indicator disk at a minimum distance from the outer face of the inspection window in a manner to afford a ceramic type and glare-proof view of said disk and thereby aid in distinguishing color changes.

Still further objects, advantages and features of the invention will become apparent was the following specific description is read in connection with the accompanying drawings, in which.

Figure 1:
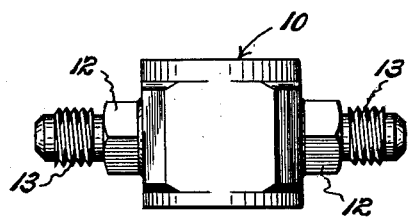
FIG. 1 is a side elevational view of a liquid-moisture indicator device constructed in accordance with the invention.
Figure 3:
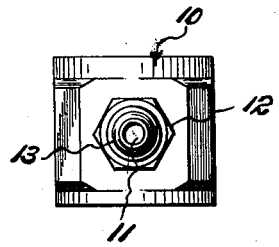
FIG. 3 is an end view.
Figure 2:
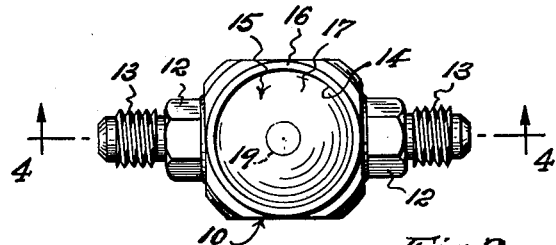
FIG. 2 is a top plan view of the same.
Figure 4:
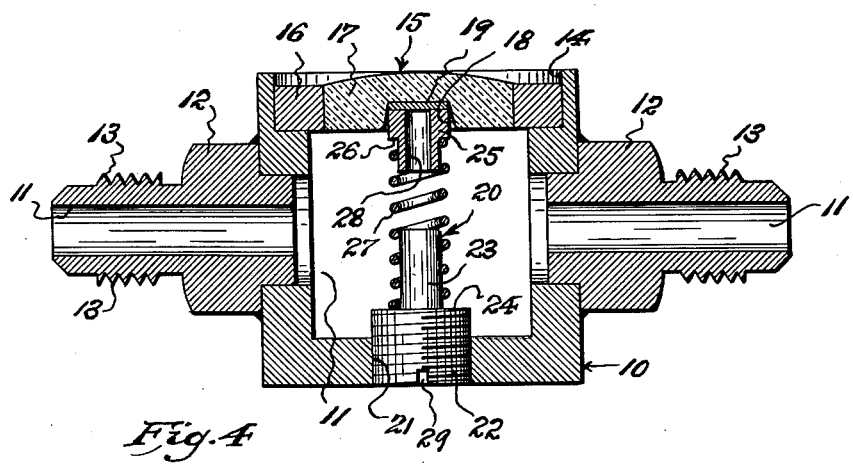
FIG. 4 is a large-scale longitudinal vertical section of the device, taken on line 4—4 in FIG. 2.

Referring now in detail to the drawings, wherein like reference characters designate corresponding parts in the several views, it will be observed that my improved liquid-moisture indicator includes a compact metallic body 10 having a through passage 11 for flow of the refrigerant or other fluid in a conducting pipe line (not shown). Body 10 is provided at its opposite ends with coupling nipples 12 in communication with through passage 11 for connection to the respective upstream and downstream portions of the pipe line. In the illustrative example, nipples 12 are shown as separate parts brazed to body 10, but it is to be understood that an equivalent structure would be to have said nipples and said body made in one piece. Moreover, both nipples 12—12 are shown to be of male construction with external screw threads 13, whereas it is within the scope of the invention to make either one or both of said nipples of female construction with internal threads.

One lateral wall of body 10 (the top wall in this instance) is provided with a first aperture 14 of large diameter and preferably circular cross-section. A window element 15 is countersunk with a fluid-tight joint in first aperture 14 and preferably includes an outer metal ring 16 and a central transparent member 17 of glass. Ring 16 and transparent member 17 are united by a metal-to-glass joint in a hermetically sealed manner.

Transparent window element 15 is provided centrally with a recess, or dimple, 18 in its inner face. This recess 18 preferably is circular in cross-section and is adapted to receive a disk-like moisture indicating element 19 made of absorbent paper impregnated with a chemical substance which will change color when exposed to moisture in the fluid stream as it passes through flow passage 11. The inner, or bottom, face of recess 18 is flat so that disk-like moisture indicating element 19 may be seated flat in even contact with said face. The depth of recess 18 is such that moisture indicating element 19 will be as near as practicable to the outer face of transparent window element 15 in order to give the said indicating element 19 a glare-proof, ceramic type appearance to help in distinguishing any color change caused by moisture in the fluid stream. Recess 18 also insures positive positioning of moisture indicating element 19 in the center of transparent window element 15 for best visibility. For reasons which will appear as the description progresses, the side wall of recess, or dimple, 18 is flared in the direction of flow passage 11.

Spring-loaded retainer means is introduced in my indicator device to provide constant positive compression against moisture indicating element 19 regardless of any expansion or contraction of the parts due to the thermal operating conditions. This spring-loaded retainer means preferably is embodied in a retainer assembly 20, which may be inserted into operative position inside body 10 through a second aperture 21 provided in the lateral, or bottom, wall of said body directly opposite to first aperture 14.

Retainer assembly 20 includes a screw plug 22 which has screw threaded connection with second aperture 21 in body 10 and is provided with an internal stem 23 aligned with recess 18 in transparent window element 15. An upwardly facing limiting shoulder 24 is formed at the juncture of screw plug 22 with its stem 23 for a purpose which will appear presently. A vertical tubular presser member 25 is adapted to penetrate recess 18 of transparent window element 15 for contact of its rim with the narrow marginal portion of moisture indicating element 19. Presser member 25 has its inner portion reduced in diameter to provide a downwardly facing external shoulder 26. A compression coil spring 27 is interposed between screw plug 22 and presser member 25 with its lower end embracing stem 23 and abutting shoulder 24.

The upper end of spring 27 embraces the reduced portion of presser member 25 and abuts shoulder 26.

It should be apparent that the central bore 28 of presser member 25 will serve to conduct fluid from flow passage 11 directly upward to a comparatively large central area of moisture indicating element 19. Moreover, the flared portion of recess 18 in transparent window element 15 below moisture indicating element 19 will conduct fluid upward to the absorbent marginal edge of said element 19. As stated in the preamble to this specification, it is the primary object of my invention to increase the area of exposure of the moisture indicating element to the fluid passing through my indicator device in comparison with the exposed area provided in the prior art indicator most closely resembling my own.

It will be observed that second aperture 21 of body 10 and screw plug 22 are larger in diameter than compression spring 27 and presser member 25. This is to permit ready assembly of retainer assembly 20 in relation to body 10 by insertion through said second aperture.

Screw plug 22 is shown as being provided with a diametrical kerf 29 in its outer face for application of a screwdriver or other turning tool.

In operational use of my improved liquid-moisture indicator device in connection with the refrigerant line of a refrigeration or air conditioning system, the appearance of bubbles in the large field of transparent window element 15 surrounding central moisture indicating element 19 indicates restriction in flow or shortage of the primary refrigerant liquid. Moreover, the presence of any moisture in the primary liquid is readily detectable due to the change in coloration of the positively positioned central moisture indicating disk 19. Because of its position in dimple, or recess, 18 very close to the outer surface of transparent window element 15 in closely pressing contact with the bottom face of recess 18, moisture indicating element 19 will present a sharply defined glare-proof, ceramic type appearance. When the change in coloration occurs, it will be clearly distinguishable from the appearance of the encircling general field of window element 15.

By utilizing other paper moisture indicating elements, my device may be used as a humidity indicator in air and other gas streams.

Moisture indicating element 19 may be a single layer of paper, as shown, or may be supplemented by an additional inner layer of absorbent paper or cloth to absorb any oil carried by the primary liquid stream, such as would exist in a refrigeration system and would interfere with the color distinguishing properties of said element 19.

In order to complete the hermetic sealing of body 10, the joint between screw plug 22 and the outer rim of second aperture 21 may be soldered. Whenever it becomes necessary to adjust screw plug 22 axially or to remove it from body 10, the solder seal can be melted readily.

While the invention has been illustrated and described with respect to a particular embodiment thereof, it will be understood that it is intended to cover all changes and modifications of the embodiment shown which do not constitute departures from the spirit of the invention and scope of the appended claims.

I claim:

1. A liquid-moisture indicator comprising:
    a body having a through passage for fluid flow including inlet and outlet ports and a first aperture in its lateral wall in communication with said passage;
    coupling means to connect the inlet and outlet ports of the body in a fluid conducting pipe line;
    a transparent window element mounted in closing relation to said first aperture of the body;
    a disk-like moisture indicating element adapted to be held in flat contact with the inner face of the window element; and
    a retainer assembly for said moisture indicating element including
        a laterally extending tubular presser member having its annular outer end arranged to engage the marginal edge portion of the moisture indicating element, and its inner end in communication with the flow passage of said body in a manner to expose a central area of said element of maximum expanse to liquid flowing through the body passage, and
        means to force the presser member toward the window element to exert retaining pressure on the moisture indicating element.

2. A liquid-moisture indicator comprising:
    a body having a through passage for fluid flow including inlet and outlet ports, a first aperture in its lateral wall in communication with said passage, and a screw-threaded second aperture in its lateral wall in a position diametrically opposite to said first aperture;
    coupling means to connect the inlet and outlet ports of the body in a fluid conducting pipe line;
    a transparent window element mounted in closing relation to said first aperture of the body;
    a disk-like moisture indicating element adapted to be held in flat contact with the inner face of the window element; and
    a retainer assembly for said moisture indicating element including:
        a laterally extending tubular presser member having its outer end arranged to engage the marginal edge portion of the moisture indicating element and its inner end in communication with the flow passage of said body in a manner to expose a central area of said element of maximum expanse to liquid flowing through the body passage, said presser member being reduced in outside diameter at the inner end thereof to provide an annular shoulder;
        a screw plug in threaded engagement with said second body aperture for axial adjustment with respect to the tubular presser member; and
        a compression coil spring interposed between the shoulder of said presser member and the inner end of said screw plug.

3. The invention defined in claim 2, wherein the retainer assembly also includes a short stem projecting inwardly from the screw plug and fitting inside the adjacent end of the compression spring but terminating in spaced relation to the inner end of the tubular presser member.

4. The invention defined in claim 1, wherein the transparent window element has a recess in its inner face constructed and arranged to receive the moisture indicating element and the outer end of the presser member of the retainer assembly and reduce the thickness of the window element adjacent to said recess, whereby the moisture indicating element will present a sharply defined glareproof ceramic type appearance.

5. The invention defined in claim 4, wherein the recess in the transparent window element substantially matches the moisture indicating element and presser member of the retainer assembly in cross-sectional form and area of expanse and has a flat bottom face for flat contact with said moisture indicating element.

6. The invention defined in claim 5, wherein the recess in the transparent window element is flared in the direction of the fluid flow passage in the body to give access of fluid to the marginal edge of the moisture indicating element in circumferentially by-passing relation to the presser member in addition to the central exposed area and to afford draft during replacement of said element.

7. A liquid-moisture indicator comprising:
    a body having a through passage for fluid flow including inlet and outlet ports and a first aperture in its lateral wall in communication with said passage;
    a transparent window element of glass mounted in closing relation to said first aperture of the body and having a recess in its inner face;

a disk-like moisture indicating element positioned in the recess of said window element in contact with the bottom wall thereof, the depth of the recess being such that the thickness of the glass covering said moisture indicating element is reduced in comparison to the surrounding area of glass, whereby said indicating element has a sharply defined glare-proof ceramic-type appearance in contrast with the surrounding field of the window element.

References Cited in the file of this patent
UNITED STATES PATENTS

| | | |
|---|---|---|
| 1,737,514 | Nikolish | Nov. 26, 1929 |
| 2,888,898 | Patterson | June 2, 1959 |
| 2,994,295 | Newcum | Aug. 1, 1961 |